(12) United States Patent
Jin

(10) Patent No.: US 12,420,365 B2
(45) Date of Patent: Sep. 23, 2025

(54) TOOL KIT FOR HEAT EXCHANGER AND METHOD OF DETACHING HEAT EXCHANGER END COVER

(71) Applicant: Carrier Corporation, Palm Beach Gardens, FL (US)

(72) Inventor: Da Jin, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/597,289

(22) Filed: Mar. 6, 2024

(65) Prior Publication Data

US 2024/0300060 A1    Sep. 12, 2024

(30) Foreign Application Priority Data

Mar. 6, 2023   (CN) .......................... 202310204941.6

(51) Int. Cl.
*E05D 7/00* (2006.01)
*B23P 19/04* (2006.01)

(52) U.S. Cl.
CPC ......... *B23P 19/04* (2013.01); *F28F 2280/105* (2013.01)

(58) Field of Classification Search
CPC ... E05D 7/1022; E05D 7/1005; E05D 7/1027; E05D 7/1055; E05D 7/123; E05D 3/02; E05D 5/02; E05D 5/12; E05D 5/128; E05D 2005/108; A47B 2220/0072; B23P 19/04; F28F 2280/105
See application file for complete search history.

(56) References Cited

U.S. PATENT DOCUMENTS

| | | | | |
|---|---|---|---|---|
| 3,196,845 A | * | 7/1965 | Ganz | F22B 37/147 122/498 |
| 3,721,363 A | * | 3/1973 | Bressler | F16J 13/06 220/849 |
| 4,669,628 A | * | 6/1987 | Hatta | E05F 15/42 49/54 |

(Continued)

FOREIGN PATENT DOCUMENTS

| | | | | |
|---|---|---|---|---|
| AU | 2014202472 B2 | * | 7/2015 | .............. F16J 13/20 |
| BE | 890698 A | * | 2/1982 | .............. A01J 27/04 |
| CN | 112298835 A | * | 2/2021 | |

OTHER PUBLICATIONS

Extended European Search Report received for EP Application No. 24161164.9, mailed on Aug. 1, 2024, 07 Pages.

*Primary Examiner* — Chuck Y Mah
(74) *Attorney, Agent, or Firm* — Drew Folgmann

(57) ABSTRACT

The present invention provides a tool kit for a heat exchanger and a method for detaching an end cover of a heat exchanger. The tool kit comprises: a first hinge device and a second hinge device, wherein the first hinge device and the second hinge device are mounted between an end flange and the end cover at a first position and a second position on the same axis, the first hinge device and the second hinge devices each comprising: a base, configured to be fixedly connected to the end flange; a rotating member, configured to be fixedly connected to the end cover; and a connecting member, configured to be detachably connected to the base and the rotating member, so that the rotating member is capable of rotating along the same axis relative to the base.

18 Claims, 6 Drawing Sheets

(56) References Cited

U.S. PATENT DOCUMENTS

| | | | | |
|---|---|---|---|---|
| 4,865,513 | A * | 9/1989 | Norris | B66C 23/208 29/434 |
| 5,722,121 | A * | 3/1998 | Lau | E05D 5/128 16/389 |
| 6,454,117 | B1 * | 9/2002 | Pysher | F16J 13/20 292/256.73 |
| 7,810,671 | B2 * | 10/2010 | DePietro | B65D 90/10 220/817 |
| 7,931,168 | B2 * | 4/2011 | DePietro | F16J 13/18 220/817 |
| 8,038,031 | B2 * | 10/2011 | DePietro | B65D 90/10 16/382 |
| 10,180,022 | B1 * | 1/2019 | Garg | F16J 13/18 |
| 10,633,226 | B2 * | 4/2020 | Dong | E02D 29/1463 |
| 2005/0242051 | A1 * | 11/2005 | Porebski | B66C 23/203 212/179 |
| 2008/0127565 | A1 | 6/2008 | Taylor | |
| 2008/0256753 | A1 * | 10/2008 | DePietro | B65D 90/10 16/382 |
| 2016/0363393 | A1 * | 12/2016 | Wolfgram | F28F 9/0219 |
| 2023/0056050 | A1 * | 2/2023 | Francis | E05D 11/1028 |

\* cited by examiner

TOOL KIT FOR HEAT EXCHANGER AND METHOD OF DETACHING HEAT EXCHANGER END COVER

CROSS REFERENCE TO RELATED APPLICATIONS

This application claims priority to Chinese Patent Application No. 202310204941.6 filed on Mar. 6, 2023, which is incorporated by reference herein in its entirety.

FIELD OF THE INVENTION

The present invention relates to the technical field of maintenance tools for heat exchangers, in particular to a tool kit and method for detaching an end cover of a heat exchanger.

BACKGROUND OF THE INVENTION

Refrigeration units often employ multiple heat exchangers, such as falling-film heat exchangers or flooded heat exchangers. A common falling-film heat exchanger or flooded heat exchanger includes a cylindrical housing and end covers at both ends. The heat exchange tube bundle is arranged in the space inside the housing, and chilled/cooling water (or other media) enter the heat exchange tube bundle through the end covers to exchange heat with the refrigerant circulating on the housing side. In order to keep good heat exchange performance, it is necessary to regularly maintain the heat exchanger, where at this point the end cover needs to be detached. If the heat exchanger malfunctions, usually it is also necessary to detach the end cover. However, the end cover is relatively heavy. At present, a third party needs to be deployed for removal and hoisting of the end cover during maintenance or repair, or special tools need to be used, where these special tools may only be applicable for certain types of end covers and thus may not have universal applicability.

SUMMARY OF THE INVENTION

Embodiments of the present invention aim to solve or at least alleviate the problems existing in the prior art.

According to one aspect, a tool kit for a heat exchanger is provided, wherein the heat exchanger comprises an end flange (which may also be referred to as an end cover flange) and an end cover mounted to the end flange, the tool kit comprising:
  at least a first hinge device and a second hinge device, wherein the first hinge device and the second hinge device are mounted between the end flange and the end cover at a first position and a second position on the same axis, the first hinge device and the second hinge devices each comprising:
  a base, configured to be fixedly connected to the end flange;
  a rotating member, configured to be fixedly connected to the end cover; and
  a connecting member, configured to be detachably connected to the base and the rotating member, so that the rotating member is capable of rotating along said same axis relative to the base.

Optionally, the base comprises a first mounting hole to be connected to a first bolt hole on a back side of the end flange through a first bolt, and the rotating member comprises a second mounting hole to be connected to a second bolt hole on the end cover through a second bolt, wherein, the first bolt hole and the second bolt hole are corresponding to each other in terms of position, and are originally used to receive a mounting bolt for fastening the end cover to the end cover flange.

Optionally, the same axis is a vertical axis, wherein, the base has a first pin hole, the rotating member includes a second pin hole, and the connecting member is a pin that passes through the first pin hole and the second pin hole, where the pin is inserted along the vertical axis into the first pin hole and the second pin hole aligned with each other. Optionally, the pin comprises a cylindrical body, where a head larger in size than the cylindrical body is provided at a first end of the cylindrical body, and a through hole for installing a lock pin is provided at a second end of the cylindrical body.

Optionally, the tool kit further comprises an abutting bolt for passing through a threaded hole of the base to press against the edge of the end flange, or to press against one or more spacers arranged between the edge of the end flange and the base. Optionally, the one or more spacers include an L-shaped spacer comprising a first plane portion and a second plane portion that are perpendicular to each other, where the first plane portion is arranged on the base, and the second plane portion is arranged between the base and the edge of the end flange.

Optionally, the base comprises a back plate and a bending portion. The bending portion comprises the first pin hole and the threaded hole, where the orientation of the pin hole and that of the threaded hole are perpendicular to each other, the back plate comprises the first mounting hole, and the rotating member comprises a rotating member body and a boss at one end of the rotating member body, where the boss comprises the second pin hole.

Optionally, the tool kit further comprises a plurality of support bolts for replacing a part of the mounting bolts connected between the end cover and the end flange, so as to be connected between the end cover and the end flange when detaching all mounting bolts. The length of the plurality of support bolts is configured so that the end cover, when supported by the support bolts, can be translated along the length direction of the support bolts relative to the end flange to a position where the gap between the end cover and the end flange is at least greater than 1 cm. Optionally, the plurality of support bolts include at least three support bolts.

Optionally, the tool kit further comprises a lock member configured to lock the first hinge device and the second hinge device at a position where the end cover rotates and opens for at least 120 degrees relative to the end cover flange. Optionally, the lock member can be detachably connected to the first hinge device and the second hinge device. Optionally, the lock member is a U-shaped pin, and the base and the rotating member each includes a lock pin hole.

According to another aspect, a method for detaching an end cover of a heat exchanger is also provided, the method comprising:
  selecting a first position and a second position on the same axis close to an edge of an end flange;
  connecting bases of the first hinge device and the second hinge device to the end flange at the first position and the second position;
  connecting rotating members of the first hinge device and the second hinge device to the end cover at the first position and the second position;

connecting, using connecting members, the bases and rotating members of the first hinge device and the second hinge device; and rotating the rotating members of the first hinge device and the second hinge device along with the end cover along the same axis as to open the end cover.

Optionally, the steps of connecting the rotating member to the end cover further comprise:

replacing a part of the mounting bolts that connect the end cover and the end flange with a plurality of support bolts and detaching the remaining mounting bolts;

translating the end cover along the length direction of the support bolts relative to the end flange, so that the gap between the end cover and the end flange is greater than 1 cm; and arranging nuts in the gap, and connecting the rotating members to the end covers using bolts and nuts.

Optionally, the method further comprises: locking the rotation of the rotating member relative to the base in the first hinge device and/or the second hinge device after the end cover is opened for more than 120 degrees.

The device and method according to the embodiments of the present invention facilitate the disassembly and assembly of the heat exchanger end cover.

BRIEF DESCRIPTION OF THE DRAWINGS

With reference to the accompanying drawings, the disclosure of the present invention will become easier to understand. Those skilled in the art would easily understand that these drawings are for the purpose of illustration and example only, and are not intended to limit the protection scope of the present application. In addition, in the figures, similar numerals are used to denote similar components, where.

DETAILED DESCRIPTION OF EMBODIMENT(S) OF THE INVENTION

Figure 1:
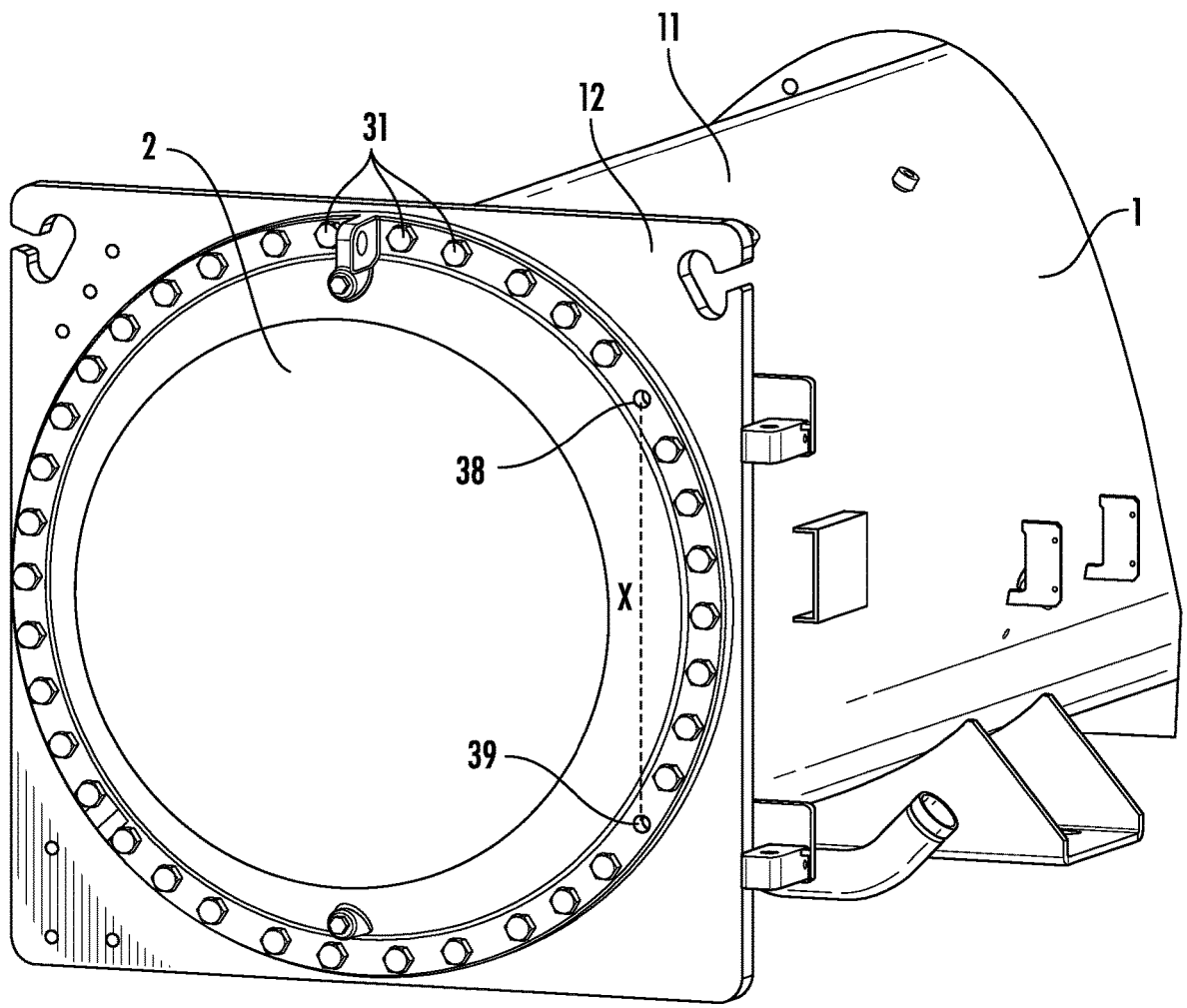
FIG. 1 shows a front side perspective view of the end of a heat exchanger.

FIG. 1 illustrates the structure of a common heat exchanger end. Heat exchanger 1 generally comprises a cylindrical housing 11, an end flange 12 at the end of housing 11, and an end cover 2 connected to the end flange 12. The end cover 2 can be connected to the end flange 12 of the housing 11 through a plurality of mounting bolts 31 distributed along the circumference. Coils 19 of the heat exchanger (FIG. 7) are arranged inside the housing 11. When maintenance is required inside the housing 11, the end cover 2 needs to be detached. However, since the end cover 2 is heavy and the heat exchanger may be installed in a high position, suitable tool kits need to be provided for detaching.

Figure 6:
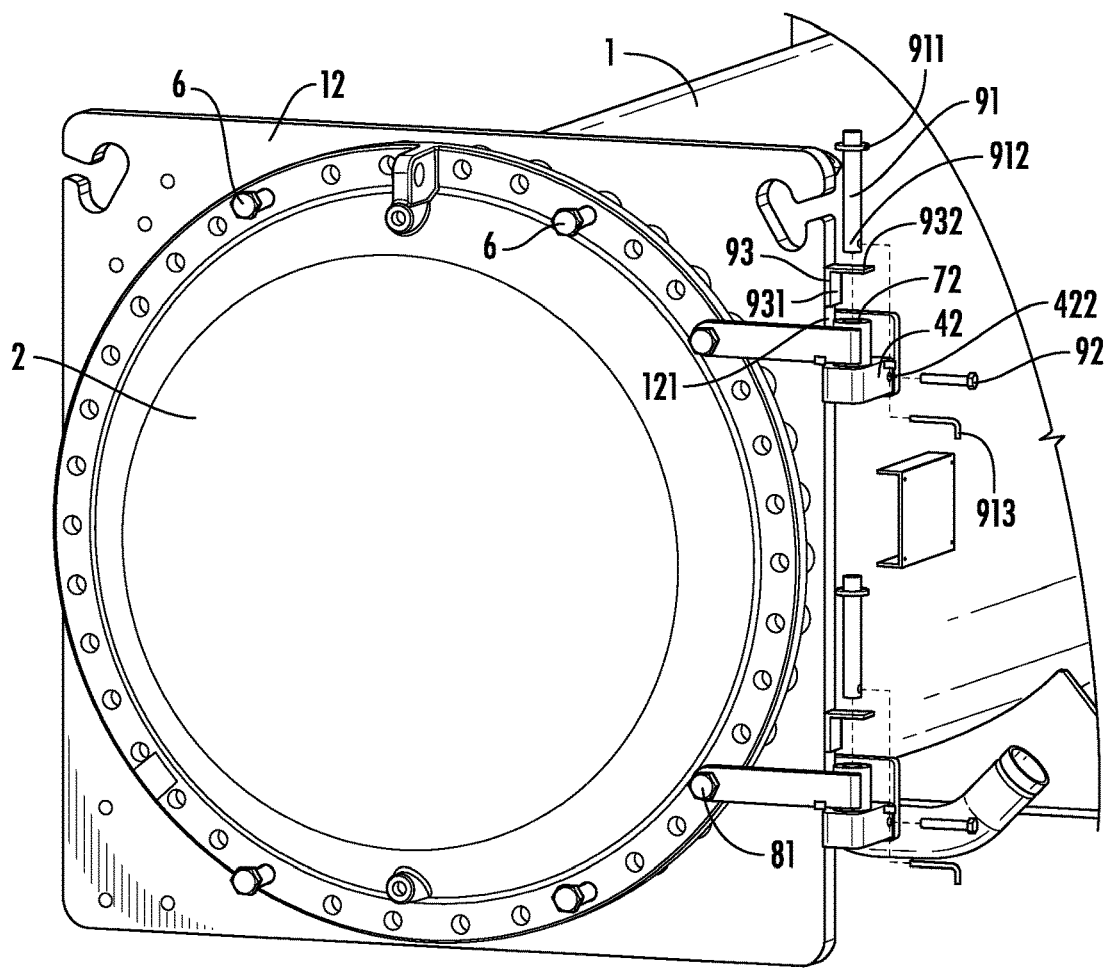
FIG. 6 shows a front side perspective view of a heat exchanger end comprising connecting members of a tool kit.
Figure 7:
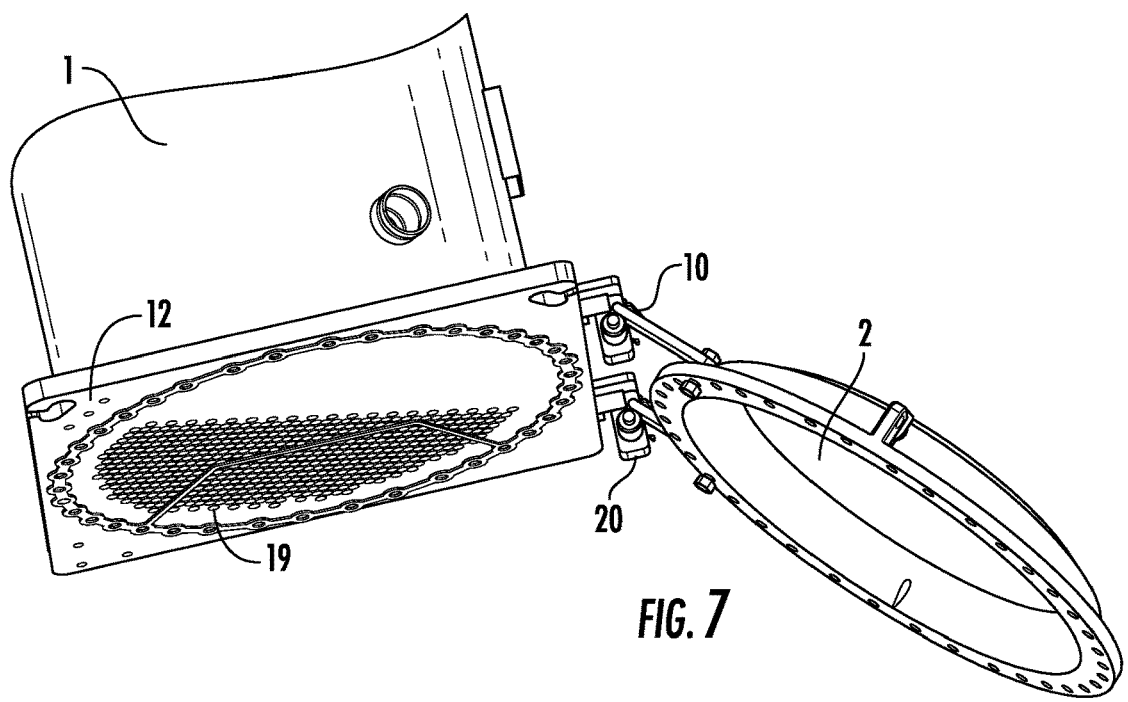
FIG. 7 shows a top side perspective view of a heat exchanger end when the end cover is opened.
Figure 8:
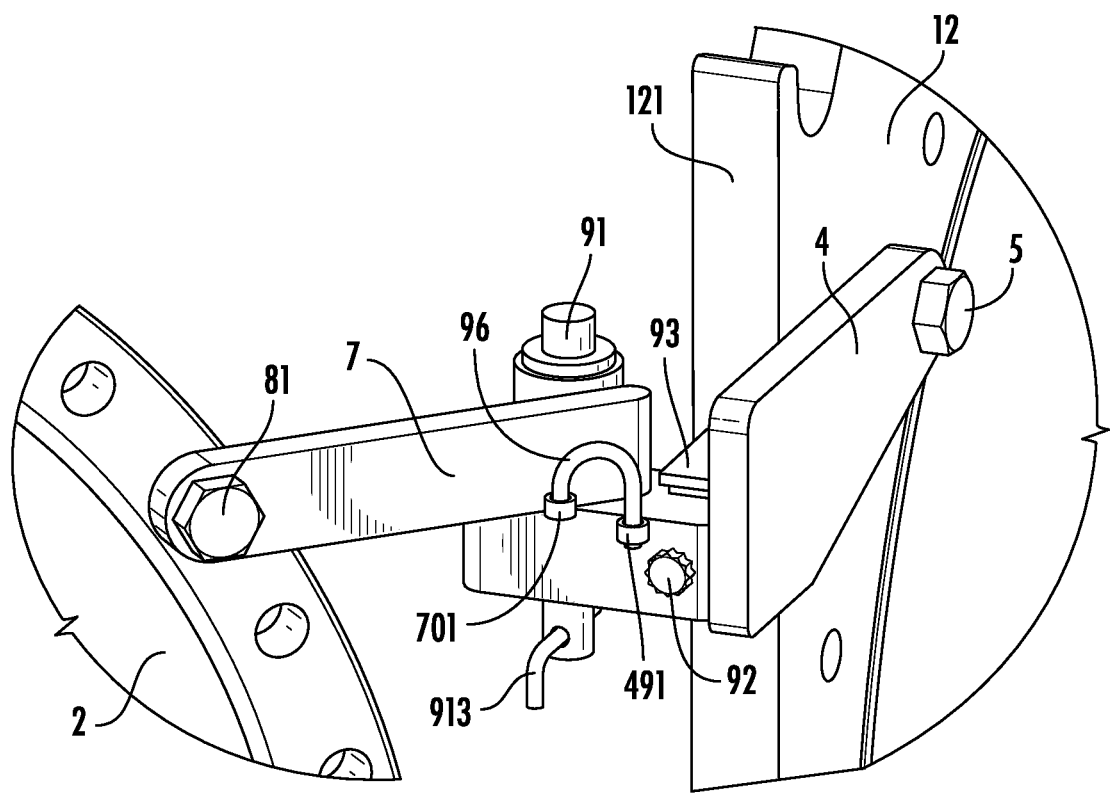
FIG. 8 shows an enlarged view of a hinge device of a tool kit of a heat exchanger end when the end cover is opened.

Referring now to FIGS. 6 to 8, a tool kit for a heat exchanger according to an embodiment of the present invention is to be described. The tool kit at least comprises: a first hinge device 10 and a second hinge device 20. The first hinge device 10 and the second hinge device 20 may have the same or similar structure. The following description will mainly focus on the first hinge device 10. The first hinge device comprises a base 4, which can be fixedly connected to the end flange 12; a rotating member 7, which can be fixedly connected to the end cover 2; and a connecting member 91, which can be detachably connected to the base 4 and the rotating member 7, so that the rotating member 7 can rotate relative to the base 4. By selecting specific positions to install the two hinge devices, the end cover 2 can be rotated and opened.

Figure 2:
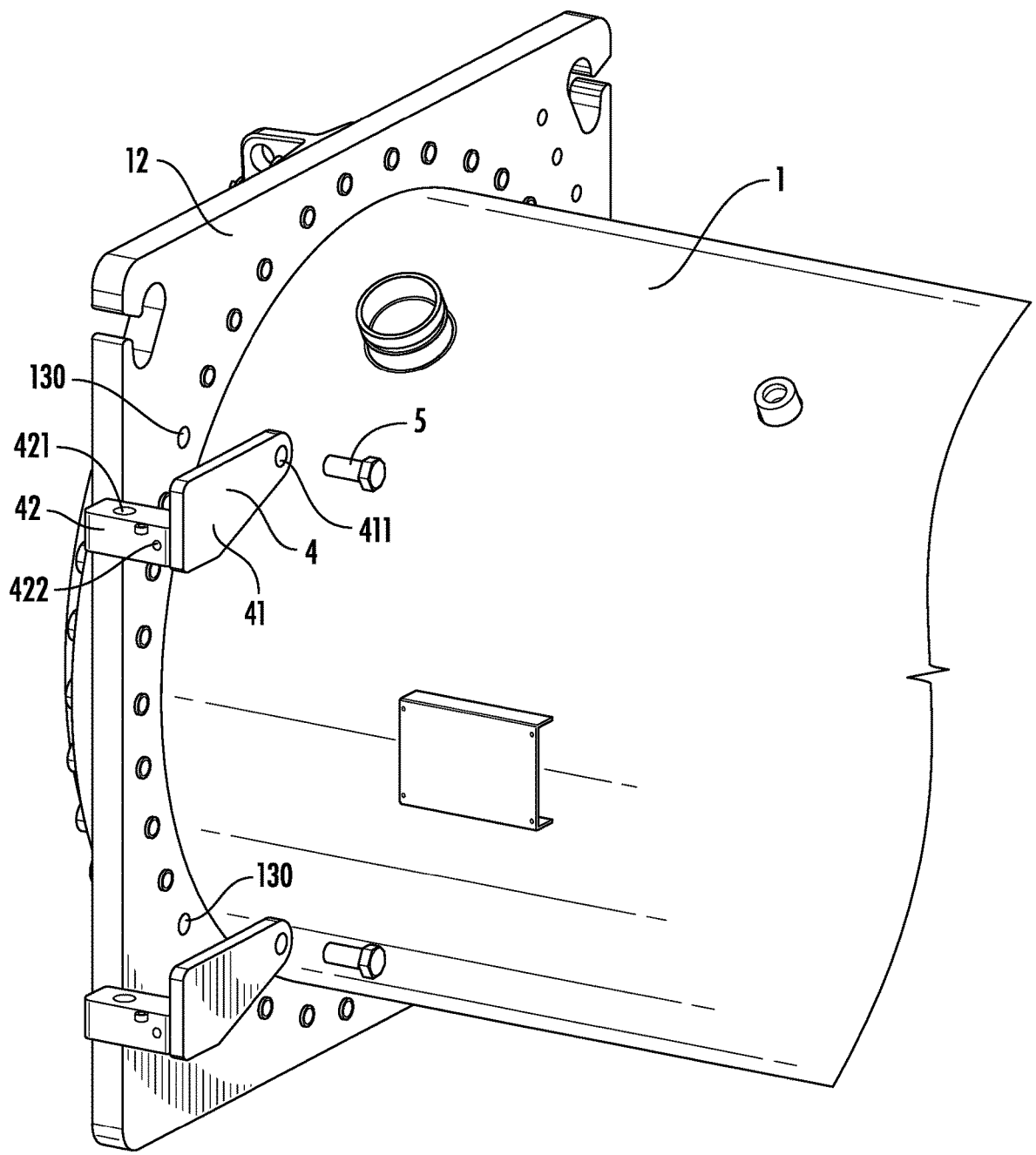
FIG. 2 shows a rear side perspective view of a heat exchanger end comprising bases of a tool kit.

In some embodiments, as shown in FIG. 1, a first position 38 and a second position 39 that are on the same axis X and with an appropriate distance (based the length of the base 4) to the edge of the end flange 12 can be selected from the positions where the plurality of mounting bolts 31 that connect the end cover 2 and the end flange 12 are located, and the mounting bolts at the first position 38 and the second position 39 are detached. And, the bolt holes of the end cover flange 12 and the end cover 2 at the first position 38 and the second position 39 are used to connect the bases 4 and rotating members 7 of the hinge devices. The axis X can be, for example, a vertical axis or a substantially vertical axis. Specifically, as shown in FIG. 2, the end cover flange 12 comprises a first bolt hole 130 on the end cover flange 12 corresponding to the first position 38 in FIG. 1, the base 4 comprises a first mounting hole 411 to connect the first bolt hole 130 from the back side of the end flange 12 through a first bolt 5, and the rotating member 7 comprises a second mounting hole to connect to a second bolt hole 230 on the end cover 2 corresponding to the first position 38 in FIG. 1 through a second bolt 81. The first bolt hole 130 and the second bolt hole 230 are corresponding to each other in terms of position, and are originally intended to receive a mounting bolt 31. In some embodiments, the first bolt hole 130 on the end cover flange 12 has internal threads, where these internal threads themselves are used to engage with the mounting bolt 31. Therefore, the first bolt 5 can also be directly threaded to the first bolt hole 130 on the end cover flange 12. In some embodiments, the second bolt hole 230 on the end cover 2 may not have internal threads. At this point, a nut 82 needs to be inserted between the end cover flange 12 and the end cover 2 to receive the second bolt 81. On the other hand, both the length of the first bolt 5 and that of the second bolt 81 should be appropriately designed to avoid being too long. For example, the length of the first bolt 5 should be configured not to exceed the end cover flange 12 when tightened, and the second bolt 81 when tightened should be configured not to exceed or slightly exceed the nut 82 which is tightly attached to the end cover 2.

With continued with reference to FIGS. 5 to 8, the base 4 has a first pin hole 421, the rotating member 7 comprises a second pin hole 72, the connecting member 91 is a pin that passes through the first pin hole 421 and the second pin hole 72 along the axis X. The pin comprises a cylindrical body, where a head 911 with a size larger than the cylindrical body is provided at the first end of the cylindrical body, and a through hole 912 for installing a lock pin 913 is provided at the second end of the cylindrical body. In the illustrated embodiment, the base 4 comprises a back plate 41 and a bending portion 42, where a first pin hole 421 is defined in the bending portion 42, and the back plate 41 includes the first mounting hole 411. The rotating member 7 comprises a rotating member body 71 and a boss at one end of the rotating member body 71, where a second pin hole 72 is defined in the boss. During assembly, the boss of the rotating member is located above the bending portion 42 of the base 4, with the second pin hole 72 being aligned with the first pin hole 421. The connecting member 91 can be directly inserted into the aligned through-hole from top to bottom along the axis X, with its head 911 at the first end supported by the boss of the rotating member. Then, a lock pin 913, for example in L-shaped, is inserted into the through-hole 912 at the second end of the connecting member 91 to prevent the connecting member 91 from coming out.

In some embodiments, in order to ensure the stable installation of the base 4, the tool kit further comprises an abutting bolt 92, which is used to pass through a threaded hole 422 on the base 4 to press against the edge 121 of the end flange 12 (see FIG. 8) or optional one or more spacers 93. Therefore, in some embodiments, the tool kit further comprises one or more spacers 93. It should be appreciated that when selecting the two mounting positions 38 and 39 shown in FIG. 1, full consideration should be taken to the mounting of the base 4, so that the gap between the bending portion 42 of the base 4 and the edge 121 of the end flange 12 is as small as possible, for example, less than 15 mm. However, even so, when the gap is greater than 5 mm, the spacer 93 can be inserted into the above gap, so that the abutting bolt 92 comes into contact with the spacer 93 and presses the spacer 93 against the edge 121 of end flange 12, thus securing the stable installation of base 4. In some embodiments, one or more spacers include an L-shaped spacer comprising a first plane portion 932 and a second plane portion 931 perpendicular to each other. The first plane portion 932 is supported by the bending portion 42 of the base, the second plane portion 931 is provided between the bending portion 42 of the base and the edge 121 of the end flange, and the abutting bolt presses against the second plane portion 931.

Figure 3:
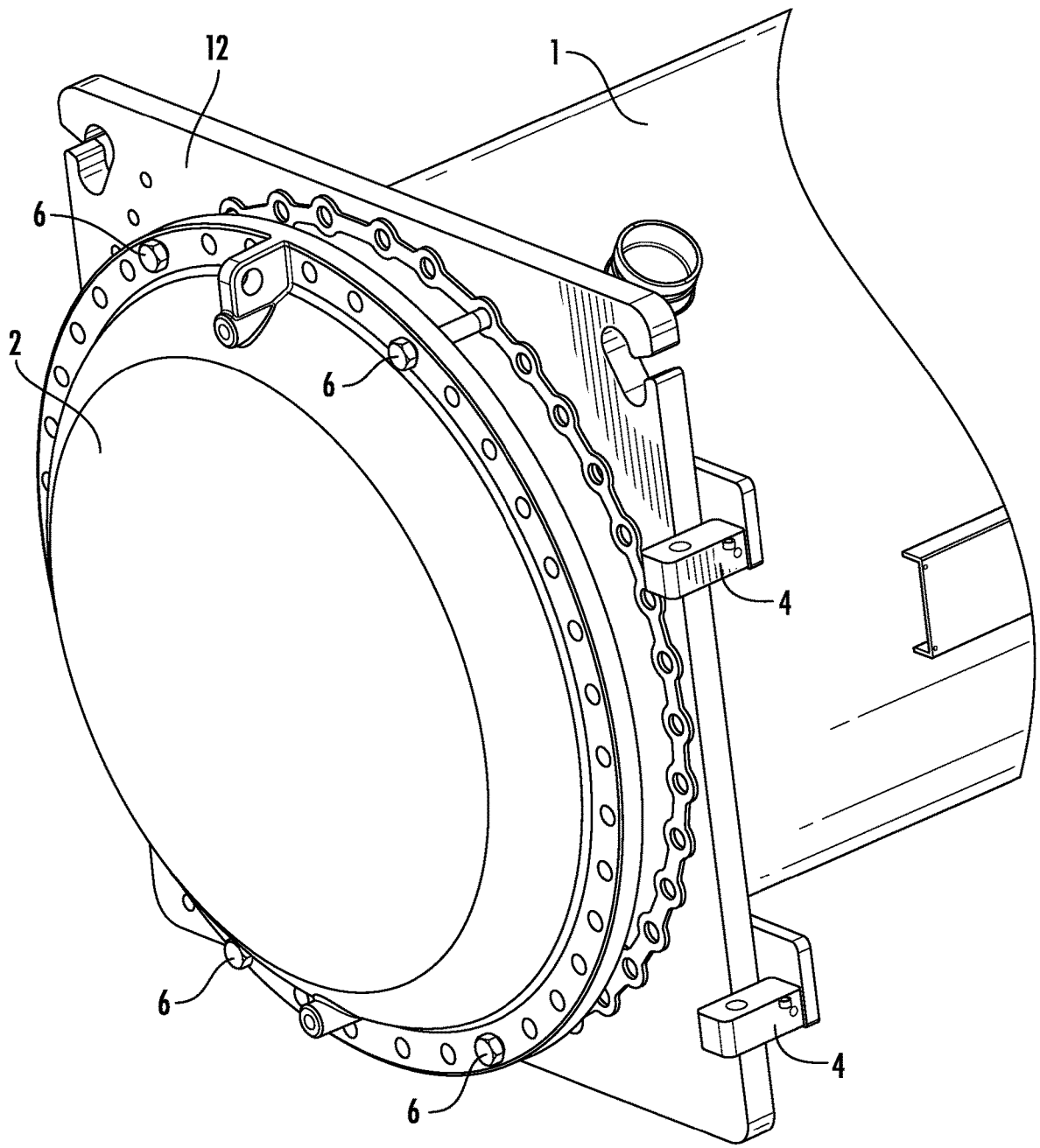
FIG. 3 shows a front side perspective view of a heat exchanger end comprising support bolts of a tool kit.
Figure 4:
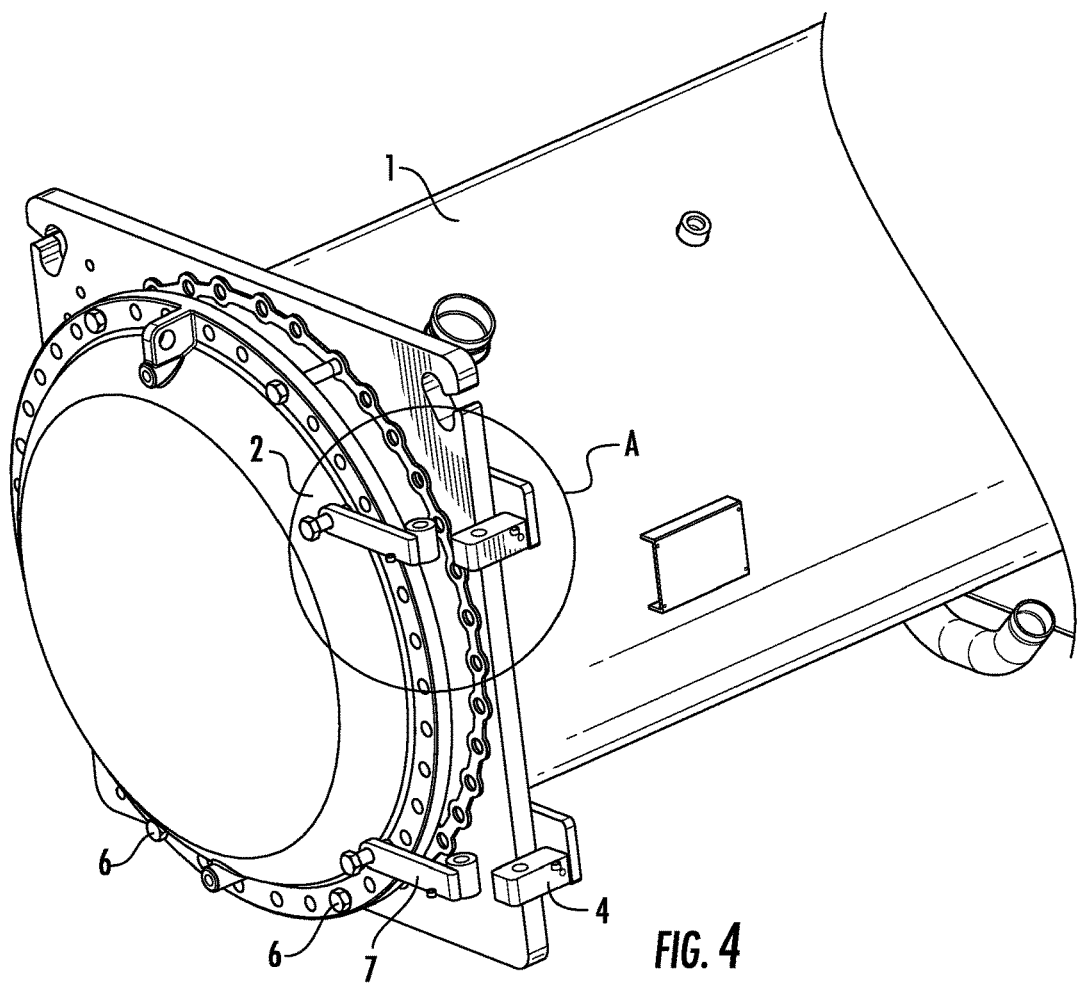
FIG. 4 shows a front side perspective view of a heat exchanger end comprising rotating members of a tool kit.
Figure 5:
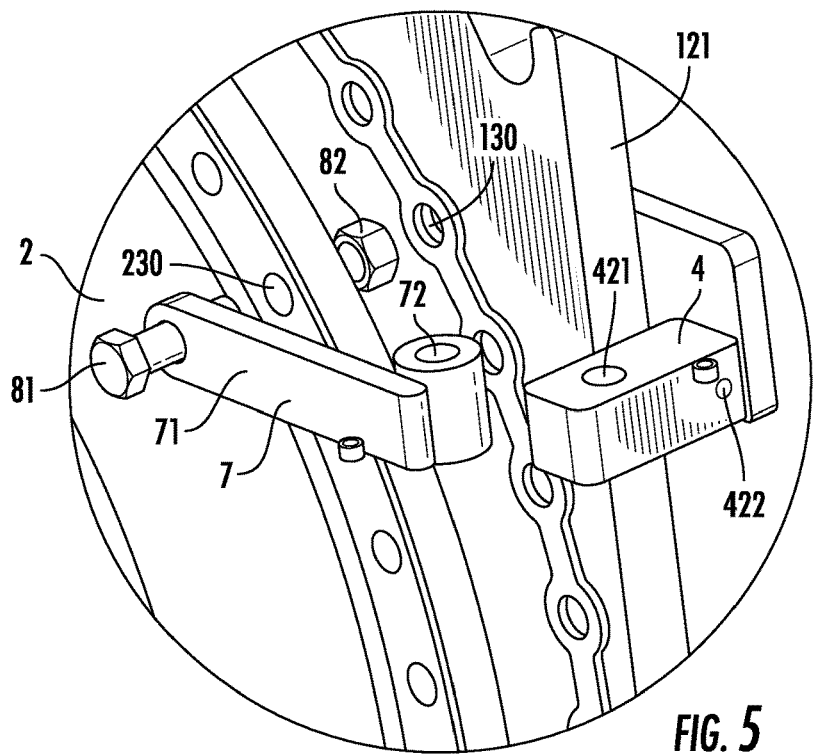
FIG. 5 shows an enlarged view of region A in FIG. 4.

With continued reference to FIGS. 3 to 5, in some embodiments, the tool kit further comprises a plurality of support bolts 6, which are used to replace a part of the mounting bolts 31 connected between the end cover 2 and the end flange 12, so as to be connected between the end cover 2 and the end flange 12. As shown in FIG. 3, four support bolts 6 are used in this embodiment, and the four support bolts 6 form the four corners of a rectangle, so that the end cover 2 can be stably supported. The length of the plurality of support bolts 6 is greater than that of the mounting bolts 31, which is configured so that the end cover 2, when supported by the support bolts 6, can be translated along the length direction of the support bolts 6 relative to the end flange 12 to a position where the gap between the end cover and the end flange is at least greater than 1 cm. Through this translation, a nut 82 can be inserted into the gap. It should be appreciated that the number and positions of the plurality of support bolts 6 can be changed as long as the end cover 2 can be stably supported. For example, only three support bolts can be provided or more support bolts can be provided. When the assembly of the first hinge device 10 and the second hinge device 20 is completed, the support bolts 6 can be detached. And, as shown in FIG. 7, the end cover 2 can be opened along the axis X of the first hinge device 10 and the second hinge device 20 for maintenance inside the heat exchanger. After the maintenance is completed, the end cover 2 can be reinstalled only by rotating the end cover 2 and performing the above steps in reverse order.

As shown in FIG. 8, the tool kit further comprises a lock member 96, which can lock the first hinge device and the second hinge device at a position where the end cover rotates and opens for at least 120 degrees relative to the end cover flange, making it convenient for the maintenance work inside the heat exchanger. In the illustrated embodiment, the lock member 96 is an external component detachably connected to the first hinge device and the second hinge device. Alternatively, the lock member 96 can be a part of the base 4, the rotating member 7, or the connecting member 91. In the illustrated embodiment, the lock member 96 is a U-shaped pin, and the base 4 and the rotating member 7 comprise lock pin holes 491, 701, respectively. The U-shaped pin can be inserted into the lock pin holes 491, 701 included in the base 4 and the rotating member 7 when the hinge devices are opened to a specific angle, so as to prevent movement of the end cover 2, thus facilitating the maintenance work.

Referring further to FIGS. 1 to 8, a method for detaching an end cover of a heat exchanger is described. The method comprises: selecting a first position 38 and a second position 39 on the same axis X close to an edge 121 of an end flange 12; connecting bases 4 of a first hinge device 10 and a second hinge device 20 to the end flange 12 at the first position 38 and the second position 39; connecting rotating members 7 of the first hinge device and the second hinge device to an end cover 2 at the first position 38 and the second position 39; connecting, using connecting members 91, the bases 4 and the rotating members 7 of the first hinge device and the second hinge device; and rotating the rotating members of the first hinge device and the second hinge device along with the end cover 2 along the same axis X to open the end cover 2. In some embodiments, the step of connecting the rotating members to the end cover further comprises: replacing part of the mounting bolts that connect the end cover and the end flange with a plurality of support bolts, and then detaching the remaining mounting bolts; translating the end cover along the length direction of the support bolts relative to the end flange, so that a gap between the end cover and the end flange is greater than 1 cm; and arranging the nuts in the gap and connecting the rotating members to the end cover using bolts and the nuts. In some embodiments, the method further comprises: locking the rotation of the rotating member relative to the base after the end cover is opened for more than 120 degrees. Although not shown, after the maintenance work is completed, the assembly of the end cover 2 can be completed by detaching the lock members 96, closing the end cover 2, mounting the support bolts 6, detaching the connecting members 91, bases 4 and rotating members 7, and reinstalling the mounting bolts 31.

It can be seen from the above description that the tool kit according to the embodiments of the present invention has a simple structure and low cost, and can be operated by a single maintenance worker. In addition, the entire operation process, whether disassembly or installation, does not require hoisting of the end cover. In addition, the tool kit is applicable to various types of heat exchangers. Therefore, the tool kit and method according to the embodiments of the present invention have advantages including but not limited to: no need for hoisting facilities, strong adaptability, simple operation, and low cost.

The specific embodiments described above are merely intended to describe the principles of the present invention more clearly, wherein various components are clearly shown or described to facilitate the understanding of the principles of the present invention. Those skilled in the art may, without departing from the scope of the present invention as defined in the appended claims, make various modifications or changes to the specific embodiments. Therefore, it should be understood that these modifications or changes should be included within the scope of patent protection of the present invention defined in the appended claims.

The invention claimed is:

1. A tool kit for a heat exchanger, wherein the heat exchanger comprises an end flange and an end cover mounted to the end flange, the tool kit comprising:
at least a first hinge device and a second hinge device, wherein the first hinge device and the second hinge device are configured to be mounted between the end flange and the end cover at a first position and a second position on a same axis, the first hinge device and the second hinge devices each comprising:
a base, configured to be fixedly connected to the end flange;
a rotating member, configured to be fixedly connected to the end cover;
a connecting member, configured to be detachably connected to the base and the rotating member, so that the rotating member is capable of rotating along the same axis relative to the base; and
an abutting bolt for passing through a threaded hole of the base to press against the edge of the end flange or to press against one or more spacers arranged between the edge of the end flange and the base.

2. The tool kit for a heat exchanger according to claim 1, wherein the base comprises a first mounting hole to be connected to a first bolt hole on a back side of the end flange through a first bolt, and the rotating member comprises a second mounting hole to be connected to a second bolt hole on the end cover through a second bolt.

3. The tool kit for a heat exchanger according to claim 1, wherein the same axis is a vertical axis, wherein, the base has a first pin hole, the rotating member comprises a second pin hole, and the connecting member is a pin that passes through the first pin hole and the second pin hole, where the pin is inserted along the vertical axis into the first pin hole and the second pin hole aligned with each other.

4. The tool kit for a heat exchanger according to claim 3, wherein the pin comprises a cylindrical body, where a head larger in size than the cylindrical body is provided at a first end of the cylindrical body, and a through hole for installing a lock pin is provided at a second end of the cylindrical body.

5. The tool kit for a heat exchanger according to claim 1, wherein the one or more spacers include an L-shaped spacer comprising a first plane portion and a second plane portion that are perpendicular to each other, where the first plane portion is arranged on the base, and the second plane portion is arranged between the base and the edge of the end flange.

6. The tool kit for a heat exchanger according to claim 5, wherein the base comprises a back plate and a bending portion, where the bending portion comprises a first pin hole and the threaded hole, orientation of the pin hole and that of the threaded hole being perpendicular to each other, the back plate comprises a first mounting hole, and the rotating member comprises a rotating member body and a boss at one end of the rotating member body, the boss comprising a second pin hole.

7. The tool kit for a heat exchanger according to claim 1, wherein the tool kit further comprises a plurality of support bolts for replacing a part of mounting bolts connected between the end cover and the end flange, so as to be connected between the end cover and the end flange when detaching all mounting bolts, where a length of the plurality of support bolts is configured so that the end cover, when supported by the support bolts, is configured to be translated along a length direction of the support bolts relative to the end flange to a position where a gap between the end cover and the end flange is at least greater than 1 cm.

8. The tool kit for a heat exchanger according to claim 7, wherein the plurality of support bolts include at least three support bolts.

9. The tool kit for a heat exchanger according to claim 1, wherein the tool kit further comprises a lock member configured to lock the first hinge device and the second hinge device at a position where the end cover rotates and opens for at least 120 degrees relative to the end cover flange.

10. The tool kit for a heat exchanger according to claim 9, wherein the lock member is configured to be detachably connected to the first hinge device and the second hinge device.

11. The tool kit for a heat exchanger according to claim 9, wherein the lock member is a U-shaped pin, and the base and the rotating member each include a lock pin hole.

12. A tool kit for a heat exchanger, wherein the heat exchanger comprises an end flange and an end cover mounted to the end flange, the tool kit comprising:
at least a first hinge device, wherein the first hinge device is configured to be mounted between the end flange and the end cover at a first position, the first hinge device comprises:
a base, configured to be fixedly connected to the end flange;
a rotating member, configured to be fixedly connected to the end cover;
a connecting member, configured to be detachably connected to the base and the rotating member, so that the rotating member is capable of rotating along the same axis relative to the base; and
an abutting bolt for passing through a threaded hole of the base to press against the edge of the end flange or to press against one or more spacers arranged between the edge of the end flange and the base.

13. The tool kit for a heat exchanger according to claim 12, wherein the one or more spacers include an L-shaped spacer comprising a first plane portion and a second plane portion that are perpendicular to each other, where the first plane portion is arranged on the base, and the second plane portion is arranged between the base and the edge of the end flange.

14. The tool kit for a heat exchanger according to claim 12, wherein the tool kit further comprises a plurality of support bolts for replacing a part of mounting bolts connected between the end cover and the end flange, so as to be connected between the end cover and the end flange when detaching all mounting bolts.

15. The tool kit for a heat exchanger according to claim 14, wherein a length of the plurality of support bolts is configured so that the end cover, when supported by the support bolts, is configured to be translated along a length direction of the support bolts relative to the end flange to a position where a gap between the end cover and the end flange is at least greater than 1 cm.

16. A method for detaching an end cover of a heat exchanger, comprising:
selecting a first position and a second position on a same axis close to an edge of an end flange;
connecting bases of a first hinge device and a second hinge device to the end flange at the first position and the second position;

connecting rotating members of the first hinge device and the second hinge device to the end cover at the first position and the second position;

connecting, using connecting members, the bases and rotating members of the first hinge device and the second hinge device;

rotating the rotating members of the first hinge device and the second hinge device along with the end cover along the same axis to open the end cover; and passing an abutting bolt through a threaded hole of the base to press against the edge of the end flange or to press against one or more spacers arranged between the edge of the end flange and the bases.

17. The method according to claim 16, wherein the step of connecting the rotating member to the end cover further comprises:

replacing a part of mounting bolts that connect the end cover and the end flange with a plurality of support bolts, and detaching remaining mounting bolts;

translating the end cover along a length direction of the support bolts relative to the end flange, so that a gap between the end cover and the end flange is greater than 1 cm; and arranging nuts in the gap and connecting the rotating members to the end cover using bolts and the nuts.

18. The method according to claim 16, wherein the method further comprises: locking rotation of the rotating member of the first hinge device and/or the second hinge device relative to the base after the end cover is opened by more than 120 degrees.

\* \* \* \* \*